(12) United States Patent
Jyumonji

(10) Patent No.: US 11,760,203 B2
(45) Date of Patent: Sep. 19, 2023

(54) ON-VEHICLE CONTROL DEVICE

(71) Applicant: Hitachi Astemo, Ltd., Hitachinaka (JP)

(72) Inventor: Kentarou Jyumonji, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 132 days.

(21) Appl. No.: 17/619,736

(22) PCT Filed: Jun. 12, 2020

(86) PCT No.: PCT/JP2020/023148
§ 371 (c)(1),
(2) Date: Dec. 16, 2021

(87) PCT Pub. No.: WO2020/262031
PCT Pub. Date: Dec. 30, 2020

(65) Prior Publication Data
US 2022/0355668 A1    Nov. 10, 2022

(30) Foreign Application Priority Data

Jun. 24, 2019 (JP) ................... 2019-116254

(51) Int. Cl.
*B60L 1/00*    (2006.01)
*G07C 5/00*    (2006.01)

(52) U.S. Cl.
CPC .............. *B60L 1/003* (2013.01); *G07C 5/008* (2013.01)

(58) Field of Classification Search
None
See application file for complete search history.

(56) References Cited

U.S. PATENT DOCUMENTS

| 2006/0112315 | A1 | 5/2006 | Reinhard et al. |
| 2015/0318772 | A1* | 11/2015 | Jahshan ................ B60L 15/025 |
| | | | 318/400.41 |
| 2017/0084088 | A1* | 3/2017 | Reichardt ............... G07C 5/008 |
| 2018/0201209 | A1 | 7/2018 | Jyumonji |
| 2019/0126775 | A1* | 5/2019 | Han .......................... B60L 3/12 |

FOREIGN PATENT DOCUMENTS

| JP | 2005-535054 A | 11/2005 |
| JP | 2016-128308 A | 7/2016 |
| JP | 2016-159672 A | 9/2016 |
| WO | 2017/013934 A1 | 1/2017 |

* cited by examiner

*Primary Examiner* — Jared Fureman
*Assistant Examiner* — Joel Barnett
(74) *Attorney, Agent, or Firm* — Volpe Koenig

(57) ABSTRACT

A failure detection frequency of failure diagnosis for a cut-off function can be improved. An on-vehicle control device includes a microcomputer that performs a control operation of an external device, a monitoring element that monitors the microcomputer, an output drive circuit that sends a control signal to the external device based on an instruction from the microcomputer, a communication circuit that switches a communication state with another on-vehicle control device based on an instruction from the monitoring element, and an energization cut-off element that energizes and cuts off a power supply voltage to be supplied to the output drive circuit based on an instruction from the monitoring element. The monitoring element independently instructs the switching of the communication state by the communication circuit and the energization and cut-off of the power supply voltage by the energization cut-off element.

12 Claims, 5 Drawing Sheets

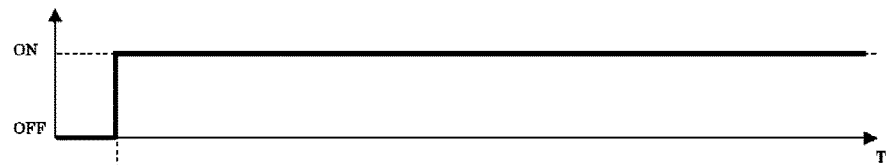
FIG. 3A POWER SUPPLY
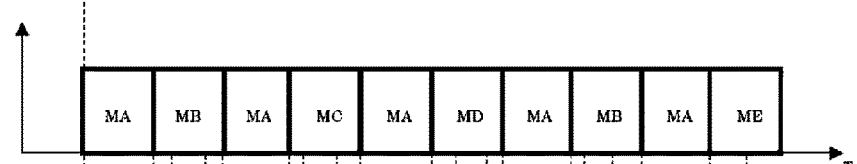
FIG. 3B MICROCOMPUTER OPERATION STATE
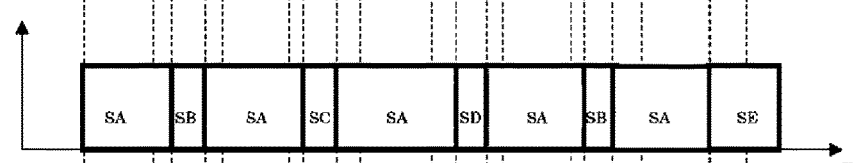
FIG. 3C MONITORING ELEMENT OPERATION STATE
FIG. 3D ENERGIZATION CUT-OFF ELEMENT CONTROL SIGNAL
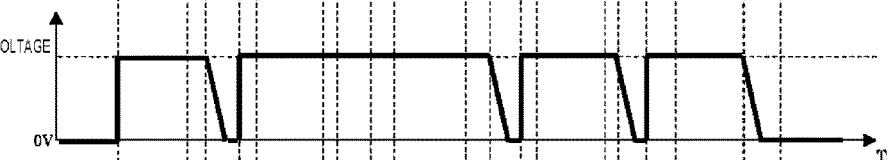
FIG. 3E OUTPUT DRIVE CIRCUIT POWER SUPPLY VOLTAGE
FIG. 3F COMMUNICATION CIRCUIT CONTROL SIGNAL
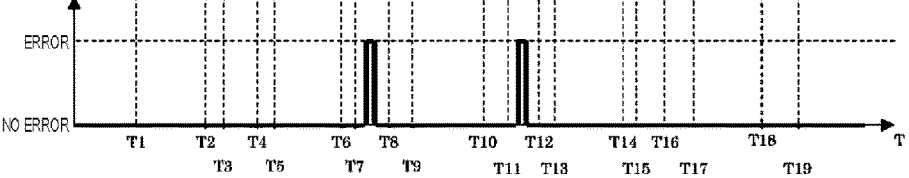
FIG. 3G COMMUNICATION STATE

FIG. 5A POWER SUPPLY
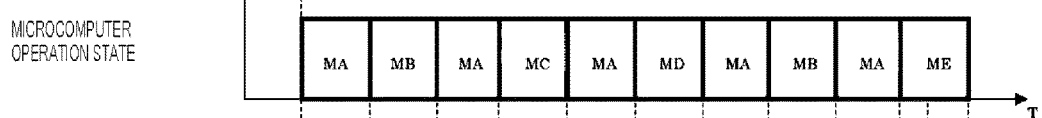
FIG. 5B MICROCOMPUTER OPERATION STATE
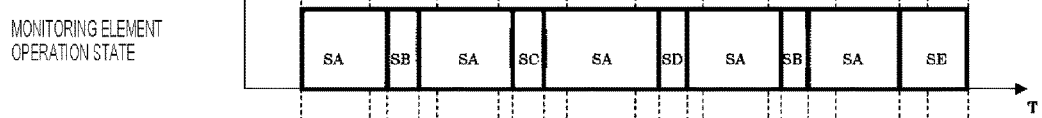
FIG. 5C MONITORING ELEMENT OPERATION STATE
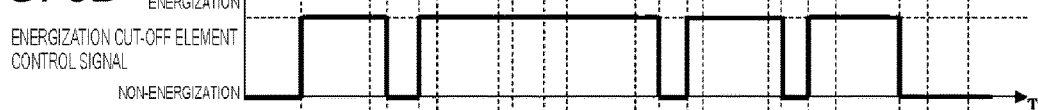
FIG. 5D ENERGIZATION CUT-OFF ELEMENT CONTROL SIGNAL
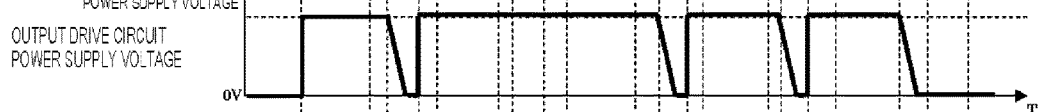
FIG. 5E OUTPUT DRIVE CIRCUIT POWER SUPPLY VOLTAGE
FIG. 5F COMMUNICATION CIRCUIT POWER SUPPLY CONTROL SIGNAL
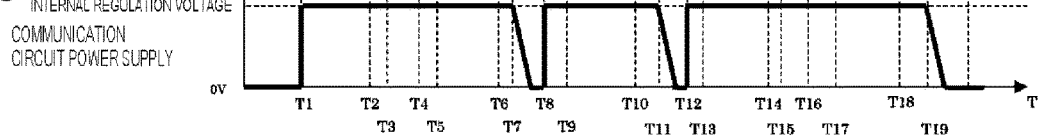
FIG. 5G COMMUNICATION CIRCUIT POWER SUPPLY

ON-VEHICLE CONTROL DEVICE

TECHNICAL FIELD

The present invention relates to an on-vehicle control device.

BACKGROUND ART

A control device of a linear solenoid which is a part of an on-vehicle electrical load is known as an example of an on-vehicle control device mounted on a vehicle.

A general control device of the linear solenoid includes a microcomputer that controls the linear solenoid, an output drive circuit that outputs a drive signal for controlling an operation of the linear solenoid based on an instruction from the microcomputer, a communication circuit that communicates with another on-vehicle control device, a monitoring element that monitors an operation of the microcomputer, and a circuit that cuts off input and output of the output drive circuit and the communication circuit.

Here, when the operation of the microcomputer is abnormal, there is a possibility that unintended operation of the output drive circuit or data transmission and reception by the communication circuit is performed. Thus, a technique for detecting an abnormal state of the microcomputer by the monitoring element and cutting off the input and output of the output drive circuit and the communication circuit when the abnormal state of the microcomputer is detected has been known (see, for example, PTL 1).

The technique described in PTL 1 is a technique for monitoring the microcomputer by the monitoring element, outputting signals for deactivating the output drive circuit and the communication circuit to these circuits from the monitoring element when an abnormality of the microcomputer occurs, cutting off the unintended operation of the output drive circuit and data transmission and reception by the communication circuit, and performing appropriate processing.

CITATION LIST

Patent Literature

PTL 1: JP 2005-535054 A

SUMMARY OF INVENTION

Technical Problem

In the technique described in PTL 1, the signal for deactivating the drive circuit and the signal for deactivating the communication circuit output from the monitoring element are common signals.

Here, when failure diagnosis for a cut-off function by the monitoring element is performed, it is necessary to perform the failure diagnosis at a timing at which an operation of the vehicle does not cause a problem even though the output drive circuit and the communication circuit are cut off. That is, in the case of the failure diagnosis for the cut-off function of the output drive circuit, it is necessary to perform the failure diagnosis under a condition limited to a time at which control accuracy in driving the load is not affected or a state in which the load is not operating. In the case of the failure diagnosis for the cut-off function of the communication circuit, it is necessary to perform the failure diagnosis under a condition limited to a state in which there is no influence even though communication with another on-vehicle control device is cut off.

However, in the technique described in PTL 1, since the signal for deactivating the drive circuit and the signal for deactivating the communication circuit are the common signals as described above, it is difficult to separately perform the failure diagnosis for the cut-off function of the output drive circuit and the failure diagnosis for the cut-off function of the communication circuit. Thus, failure diagnosis for confirming that the cut-off function operates correctly is performed only at a limited timing, and it is difficult to detect the failure of the cut-off function in a timely manner.

The present invention has been made in view of the above problems, and an object of the present invention is to provide an on-vehicle control device capable of improving a failure detection frequency of failure diagnosis for a cut-off function.

Solution to Problem

In order to solve the above problem, an on-vehicle control device according to an aspect of the present invention includes a control unit that performs a control operation of an external device, a monitoring unit that monitors the control unit, an output drive unit that sends a control signal to the external device based on an instruction from the control unit, a communication unit that switches a communication state with another on-vehicle control device based on an instruction from the monitoring unit, and an energization cut-off unit that energizes and cuts off a power supply voltage to be supplied to the output drive unit based on an instruction from the monitoring unit. The monitoring unit independently instructs the switching of the communication state by the communication unit and the energization and cut-off of the power supply voltage by the energization cut-off unit.

Advantageous Effects of Invention

According to the present invention, it is possible to realize the on-vehicle control device capable of improving the failure detection frequency of the failure diagnosis for the cut-off function.

BRIEF DESCRIPTION OF DRAWINGS

FIGS. 3A to 3G are a time chart for explaining an operation of the on-vehicle control device according to the first embodiment.

FIGS. 5A to 5G are a time chart for explaining an operation of the on-vehicle control device according to the second embodiment.

DESCRIPTION OF EMBODIMENTS

Hereinafter, embodiments of the present invention will be described with reference to the drawings. The embodiments to be described below do not limit inventions according to the claims, and all elements and combinations thereof described in the embodiments are not essential for the solution of the invention.

First, a transmission system for a vehicle to which an on-vehicle control device according to an embodiment to be described later is applied will be described.

Figure 1:
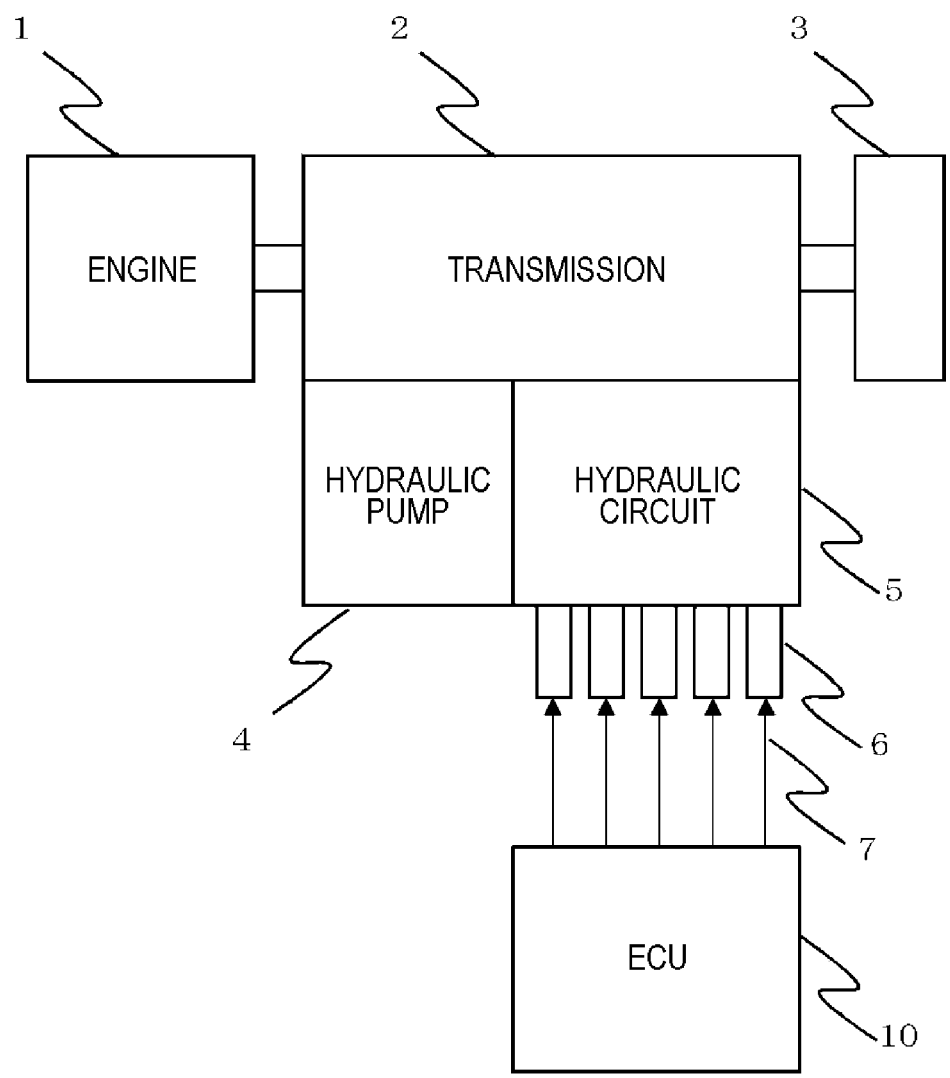
FIG. 1 is a schematic configuration diagram of a transmission system for a vehicle to which an on-vehicle control device according to an embodiment is applied.

FIG. 1 is a schematic configuration diagram of a transmission system for a vehicle to which an on-vehicle control device according to an embodiment is applied.

In FIG. 1, an engine 1 drives driving wheels 3 via a transmission 2. An operation of the transmission 2 is controlled by a hydraulic circuit 5 to which a hydraulic pressure is supplied from a hydraulic pump 4.

The hydraulic circuit 5 is driven and controlled by a plurality of linear solenoids 6. The linear solenoids 6 are driven and controlled by a drive signal 7 supplied from an electronic control unit (ECU) (on-vehicle control device) 10.

First Embodiment

Figure 2:
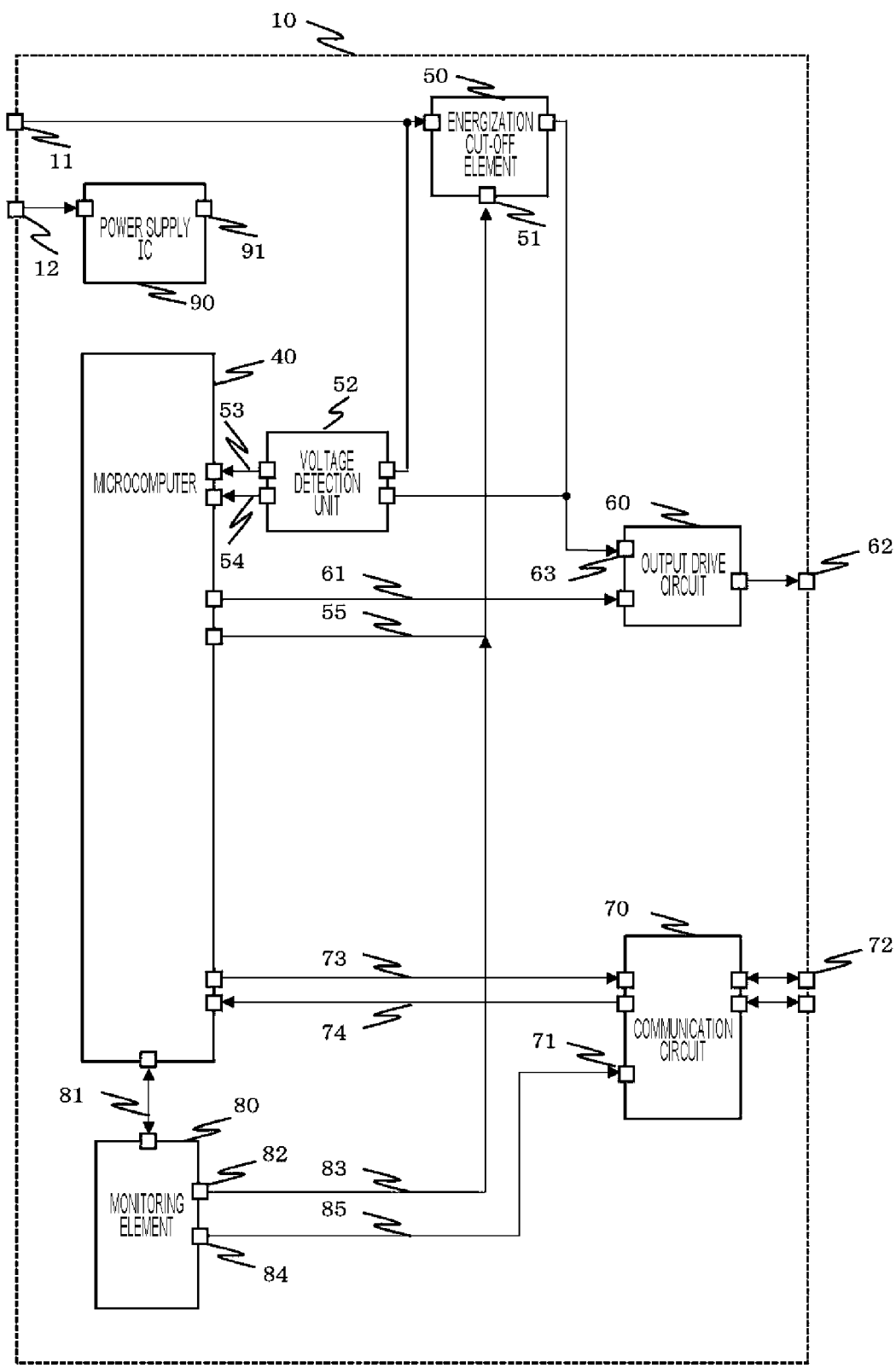
FIG. 2 is a schematic configuration diagram illustrating an on-vehicle control device according to a first embodiment.

FIG. 2 is a schematic configuration diagram illustrating the ECU (on-vehicle control device) 10 according to the first embodiment. In the following description, the ECU (on-vehicle control device) may be simply referred to as a control device 10.

In FIG. 2, the control device 10 includes a microcomputer (control unit) 40, a power supply IC 90, a monitoring element (monitoring unit) 80, an energization cut-off element (energization cut-off unit) 50, a voltage detection unit 52, an output drive circuit (output drive unit) 60, and a communication circuit (communication unit) 70.

The power supply IC 90 is connected to a downstream side of a battery (not illustrated) disposed outside the control device 10, and generates an internal power supply voltage to be supplied to an electronic circuit disposed inside the control device 10 based on a power supply voltage input via an input terminal 12 connected to the battery. The internal power supply voltage is output from an internal power supply voltage output terminal 91 of the power supply IC 90. The voltage output from the internal power supply voltage output terminal 91 is supplied to the microcomputer 40, the communication circuit 70, and the like.

The energization cut-off element 50 is connected to the downstream side of the battery disposed outside the control device 10.

The voltage detection unit 52 is connected to an upstream side and a downstream side of the energization cut-off element 50, and monitors an upstream voltage and a downstream voltage of the energization cut-off element 50. Monitoring results of the upstream voltage and the downstream voltage of the energization cut-off element 50 monitored by the voltage detection unit 52 are input to the microcomputer 40. Signals to be input to the microcomputer 40 are defined as an upstream voltage 53 and a downstream voltage 54. A switch (not illustrated) is connected to the downstream side of the battery, and is turned on or off in order to start or stop the control device 10.

The energization cut-off element 50 is driven by a signal input to an energization cut-off input terminal 51, and energizes and cuts off the power supply voltage to the downstream circuit of the energization cut-off element 50 based on the power supply voltage input via the input terminal 11 connected to the battery. When the energization cut-off element 50 is turned on (energized), the upstream voltage 53 and the downstream voltage 54 of the energization cut-off element 50 are equivalent to each other, and when the energization cut-off element 50 is turned off (cut off), the upstream voltage 53 and the downstream voltage 54 of the energization cut-off element 50 are separated from each other.

Such an energization cut-off element 50 is preferably an element that selectively switches between the energization and the cut-off of the power supply voltage based on the input signal to the energization cut-off input terminal 51, such as an electronic relay. Although elements and circuits that perform the energization and the cut-off of the energization of the power supply voltage to the output drive circuit 60 without using the energization cut-off element 50 are known, in the case of the energization cut-off element 50, an energization state of the power supply voltage to the output drive circuit 60 can be managed and monitored only by monitoring the upstream voltage 53 and the downstream voltage 54 by the voltage detection unit 52, and the energization state of the power supply voltage to the output drive circuit 60 can be reliably controlled with a simple configuration.

The output drive circuit 60 outputs the drive signal 7 for driving an external load (linear solenoid 6: external device) of the control device 10 from an output terminal 62. The output drive circuit 60 is controlled by an output drive signal 61 from the microcomputer 40. The output drive signal 61 is input to an input terminal of the output drive circuit 60. The downstream voltage of the energization cut-off element 50 is applied to a power supply voltage input terminal 63 of the output drive circuit 60, and the output drive circuit 60 operates when the energization cut-off element 50 is in an energization state.

The communication circuit 70 transmits, as transmitted data, a transmission signal 73 transmitted from the microcomputer 40 to another control device, and inputs, as a reception signal 74, reception data from the other control device to the microcomputer 40. Examples of the communication by the communication circuit 70 include communication by a controller area network (CAN).

A switching control signal 85 is input from an output terminal 84 of the monitoring element 80 to a communication state switching terminal 71, and thus, a communication state of the communication circuit 70 can be switched. As an example, the communication circuit 70 can switch the communication state to any of a state in which both data transmission and reception can be performed and a state in which both data transmission and reception are cut off.

An energization cut-off signal 55 for switching the energization cut-off element 50 between an energization state and a cut-off state is input from the microcomputer 40 to the energization cut-off input terminal 51 of the energization cut-off element 50. When the monitoring element 80 that monitors an operation of the microcomputer 40 determines that an operation state of the microcomputer 40 is abnormal, even though a signal to set the microcomputer 40 to the energization state is input, a signal prioritizing an energization cut-off signal 83 output from an output terminal 82 of the monitoring element 80 is input.

As an example of the energization cut-off signal 83 output from the output terminal 82 of the monitoring element 80, an example in which when the energization cut-off signal 55 indicates H (high) as an energization state switching signal to the energization cut-off element 50, and indicates L (low) as a cut-off state switching signal, a switching element that sets the energization cut-off signal 83 for the energization cut-off input terminal 51 to a GND (ground) state is provided between the monitoring element 80 and the energization cut-off element 50 and the input signal to the energization cut-off input terminal 51 is forcibly set to L by a switching operation is used.

The switching control signal 85 is output from the output terminal 84 of the monitoring element 80 in order to switch between a communication permission state and a communication cut-off state of the communication circuit 70. When the operation of the microcomputer 40 is normal, a communication permission signal is output to the communication circuit 70, and when the operation of the microcomputer 40 is abnormal, a communication cut-off signal is output to the communication circuit 70.

The microcomputer 40 performs failure diagnosis processing and energization control of the output drive circuit 60 based on various input and output signals. Communication processing with another control device is performed, and transmission and reception processing is performed at regular intervals, for example. A signal 81 based on the operation state of the microcomputer 40, that is, a signal for the monitoring element 80 to evaluate the operation of the microcomputer 40, is output to the monitoring element 80. The microcomputer 40 has a self-diagnosis function, and diagnoses that various built-in functions of the microcomputer 40 are in a normal state. A signal that is the result of the self-diagnosis function is included in the signal 81 that is output to the monitoring element 80.

As the self-diagnosis function described above, for example, diagnosis functions such as an analog-to-digital conversion function and an arithmetic function are conceivable, and contents of transmitted data are different between a case where the analog-to-digital conversion function fails and a case where the arithmetic function fails. Here, although the above-described two diagnosis functions of the microcomputer 40 are described, the diagnosis functions for the functions built in the microcomputer 40 are not restricted.

The monitoring element 80 monitors whether the operation of the microcomputer 40 is correctly performed. A monitoring method uses a communication system for mutual monitoring. When the monitoring element 80 detects an operation abnormality of the microcomputer 40, that is, evaluates a response notified from the microcomputer 40 to the monitoring element 80 and determines that the operation abnormality occurs in the microcomputer 40, control signals for performing fail-safe operations, that is, the energization cut-off signal 83 and the switching control signal 85 are output from the monitoring element 80.

As described above, the self-diagnosis result of the microcomputer 40 is reflected in the data transmitted from the microcomputer 40 to the monitoring element 80. For example, when the monitoring element 80 receives transmitted data indicating contents of a failure in the analog-to-digital conversion function, the monitoring element 80 outputs only the energization cut-off signal 83 for cutting off the energization cut-off element 50. When the monitoring element 80 receives transmitted data indicating that the arithmetic function of the microcomputer 40 has failed, signals for cutting off the energization cut-off element 50 and the communication circuit 70, that is, the energization cut-off signal 83 and the switching control signal 85 are output. That is, the monitoring element 80 executes different tasks of fail-safe control depending on a failure state of the microcomputer 40.

When the microcomputer 40 detects an operation abnormality of the monitoring element 80, that is, evaluates a response notified from the monitoring element 80 to the microcomputer 40 and determines that the operation abnormality occurs in the monitoring element 80, the microcomputer 40 performs processing of outputting the output drive signal 61 to the output drive circuit 60 to switch the operation of the output drive circuit 60 or transmitting the transmission signal 73 to the communication circuit 70 to notify another control device of an abnormal state in order to perform the fail-safe operation.

Communication contents of the mutual monitoring between the microcomputer 40 and the monitoring element 80 include a cut-off permission signal and a cut-off execution signal for the energization cut-off element 50 and the communication circuit 70 to be described later.

Next, an operation of the control device 10 will be described in detail with reference to FIGS. 3A to 3G.

FIGS. 3A to 3G is a time chart for explaining the operation of the on-vehicle control device according to the first embodiment.

FIGS. 3A to 3G illustrate operation states of various control devices together with transition of time T on a horizontal axis. FIG. 3A illustrates the power supply voltage to be supplied to the control device 10, and a vertical axis represents the power supply voltage. In the drawing, a case where the power supply voltage is ON indicates that the control device 10 is operating.

FIG. 3B illustrates the operation state of the microcomputer 40 and is distinguished between operation states MA to ME. The operation state MA indicates a state in which it is necessary to continuously operate the output drive circuit 60 and the communication circuit 70. The operation state MB indicates a state in which the output drive circuit 60 may be stopped. The operation state MC indicates a state in which the communication circuit 70 may be cut off. The operation state MD indicates a state in which both the output drive circuit 60 and the communication circuit 70 may be stopped. The operation state ME indicates a state in which the microcomputer 40 is in the abnormal state and the output drive circuit 60 and the communication circuit 70 cannot be correctly controlled.

FIG. 3C illustrates an operation state of the monitoring element 80 and is distinguished between operations state SA to SE. The operation state SA is a state in which the operation of the microcomputer 40 is monitored. The operation state SB is a state in which the operation of the microcomputer 40 is monitored and the failure diagnosis for the energization cut-off element 50 is performed. The operation state SC is a state in which the operation of the microcomputer 40 is monitored and the failure diagnosis for the cut-off function of the communication circuit 70 is performed. The operation state SD is a state in which the operation of the microcomputer 40 is monitored and the failure diagnosis for the energization cut-off element 50 and the failure diagnosis for the cut-off function of the communication circuit 70 are performed. The operation state SE is a state in which the operation abnormality of the microcomputer 40 is detected and the monitoring element 80 performs the fail-safe control.

FIG. 3D illustrates an operation of a control signal of the energization cut-off element 50. When the operation states of the microcomputer 40 are MB and MD and the operation states of the monitoring element 80 are SB and SD, the control signal of the energization cut-off element 50 is switched between energization and non-energization.

FIG. 3E illustrates a state of the downstream voltage of the energization cut-off element 50, that is, the power supply voltage of the output drive circuit 60, and describes the state together with FIG. 3D. When the control signal of the energization cut-off element 50 illustrated in FIG. 3D is in the energization state, the power supply voltage of the output drive circuit 60 becomes a voltage corresponding to a battery voltage. When the control signal of the energization cut-off element 50 illustrated in FIG. 3D is in the non-energization state, the power supply voltage of the output drive circuit 60 becomes a voltage corresponding to 0 V.

Next, the operations of FIGS. 3B, 3C, 3D, and 3E will be described together. Times T2 to T5 are times when it is determined that there is no influence in the system controlled by the control device 10 even though the microcomputer 40 stops the output drive circuit 60, and for example, it is conceivable that the vehicle is stopped. That is, times T3 to T5 are times at which the microcomputer 40 notifies the monitoring element 80 of the cut-off permission signal of the energization cut-off element 50 indicating that the cut-off of the energization cut-off element 50 is permitted by a mutual monitoring communication signal 81.

Times T3 to T4 are times at which the monitoring element 80 outputs a non-energization signal to the energization cut-off element 50 according to information notified from the microcomputer 40. From times T3 to T4, the monitoring element 80 notifies the microcomputer 40 of the cut-off execution signal indicating that the energization cut-off element 50 is cut off by the mutual monitoring communication signal 81.

Based on the cut-off execution signal notified from the monitoring element 80, the microcomputer 40 monitors the power supply voltage of the output drive circuit 60 illustrated in FIG. 3E, that is, the downstream voltage 54 of the energization cut-off element 50, confirms that the power supply voltage decreases during the cut-off, and determines that the cut-off function of the output drive circuit 60 is normal. On the other hand, when it is determined that the downstream voltage 54 of the energization cut-off element 50 has not decreased based on the cut-off execution signal of the energization cut-off element 50 notified from the monitoring element 80, the microcomputer 40 determines that the cut-off function of the output drive circuit 60 has failed. Although the operation states of the control device from times T2 to T5 have been described, the same operation state is also applied to times T14 to T17 illustrated in FIGS. 3A to 3G.

FIG. 3F illustrates an operation of a control signal for switching the operation of the communication circuit 70. When the operation states of the microcomputer 40 are MC and MD and the operation states of the monitoring element 80 are SC and SD, the switching control signal 85 is input to the communication circuit 70, and thus, communication and non-communication (communication cut-off) of the communication circuit 70 are switched.

FIG. 3G illustrates the communication state in the communication circuit 70, and describes the state together with FIG. 3F. When the signal for switching the operation of the communication circuit 70 shown in FIG. 3F is communication, since communication with another control device is normally performed, the communication state is no error. On the other hand, when the signal for switching the operation of the communication circuit 70 is non-communication, since communication with another control device is not normally performed, the communication state becomes error.

Next, the operations of FIGS. 3B, 3C, 3F, and 3G will be described together. Times T6 to T9 are times at which it is determined that there is no influence in the system controlled by the control device 10 even though the microcomputer 40 stops communication. For example, these times are times between a current transmission and reception timing and a next transmission and reception timing when transmission and reception communication is performed with another control device at regular intervals. That is, times T6 to T9 are times at which the microcomputer 40 notifies the monitoring element 80 of a communication cut-off permission signal indicating that the cut-off of the communication circuit 70 is permitted by the mutual monitoring communication signal 81.

Times T7 to T8 are times at which the monitoring element 80 outputs a non-communication signal (switching control signal 85) to the communication circuit 70 according to information notified from the microcomputer 40. From times T7 to T8, the monitoring element 80 notifies the microcomputer 40 of the cut-off execution signal indicating that the communication circuit 70 is cut off by the mutual monitoring communication signal 81.

The microcomputer 40 monitors the presence or absence of an error in the communication state illustrated in FIG. 3G based on the cut-off execution signal notified from the monitoring element 80, confirms that the error occurs during the cut-off, and determines that the cut-off function of the communication circuit 70 is normal. On the other hand, when the occurrence of the error in the communication state cannot be confirmed based on the cut-off execution signal of the communication circuit 70 notified from the monitoring element 80, the microcomputer 40 determines that the cut-off function of the communication circuit 70 has failed.

In the above description, although the diagnosis for the output cut-off function of the output drive circuit 60 and the diagnosis for the communication cut-off function of the communication circuit 70 have been individually described, there is no problem even though the failure diagnosis for the output function and the failure diagnosis for the communication cut-off function are simultaneously performed as indicated by times T10 to T13 in FIGS. 3A to 3G.

Next, operations of the control device 10 after time T18 will be described.

After time T18, the microcomputer 40 is in the abnormal state, the monitoring element 80 detects the abnormality of the microcomputer 40, and the monitoring element 80 cuts off the energization cut-off element 50 and the communication circuit 70 in stages.

From times T18 to T19, the analog-to-digital conversion function of the microcomputer 40 has failed, and the monitoring element 80 cuts off the energization cut-off element 50. That is, the communication circuit 70 is not cut off, and the microcomputer 40 can notify other control devices that the analog-to-digital conversion function of the microcomputer 40 has failed via the communication circuit 70.

After time T19, the analog-to-digital conversion function and the arithmetic function of the microcomputer 40 have failed, and the monitoring element 80 cuts off the energization cut-off element 50 and the communication circuit 70.

According to the present embodiment having the above configuration, the control device 10 includes the microcomputer 40 that performs the control operation of the linear solenoid 6, the monitoring element 80 that monitors the microcomputer 40, the output drive circuit 60 that sends the control signal to the linear solenoid 6 based on the instruction from the microcomputer 40, the communication circuit 70 that switches the communication state with another on-vehicle control device based on the instruction from the monitoring element 80, and the energization cut-off element 50 that performs the energization and cut-off of the power supply voltage supplied to the output drive circuit 60 based on the instruction from the monitoring element 80, and the monitoring element 80 independently instructs the switching of the communication state by the communication circuit 70 and the energization and cut-off of the power supply voltage by the energization cut-off element 50.

Accordingly, according to the present embodiment, it is possible to improve a failure detection frequency of the failure diagnosis for the cut-off function.

More specifically, since the monitoring element 80 independently instructs the switching of the communication state by the communication circuit 70 and the energization and cut-off of the power supply voltage by the energization cut-off element 50, even though the control device 10 is operating, at a time at which there is no problem even though the output drive circuit 60 and the communication circuit 70 are stopped, the cut-off of the power supply voltage of the output drive circuit 60, the cut-off of the communication circuit 70, or the cut-off of both the output drive circuit 60 and the communication circuit 70 is performed, and the power supply voltage of the output drive circuit 60 is monitored. It can be confirmed that the voltage of the output circuit decreases to a voltage at which the output circuit does not operate, or it can be confirmed that the error occurs in the communication circuit 70. Accordingly, the frequency of the failure diagnosis for the cut-off function for each circuit can be increased, and the failure detection of the cut-off function can be performed early.

According to the present embodiment, the monitoring element 80 can switch the circuit to be cut off according to the failure diagnosis state of the microcomputer 40, and can achieve stepwise fail-safe.

That is, in the technique described in PTL 1 described above, the signal for deactivating the drive circuit and the signal for deactivating the communication circuit output from the monitoring element are common signals, and when the failure occurs in the microcomputer, the stepwise fail-safe control, for example, control for deactivating the drive circuit after the communication circuit is deactivated after a certain time has elapsed cannot be constructed.

According to the control device 10 of the present embodiment, since the monitoring element 80 independently instructs the switching of the communication state by the communication circuit 70 and the energization and cut-off of the power supply voltage by the energization cut-off element 50, the stepwise fail-safe control can be realized.

Second Embodiment

Figure 4:
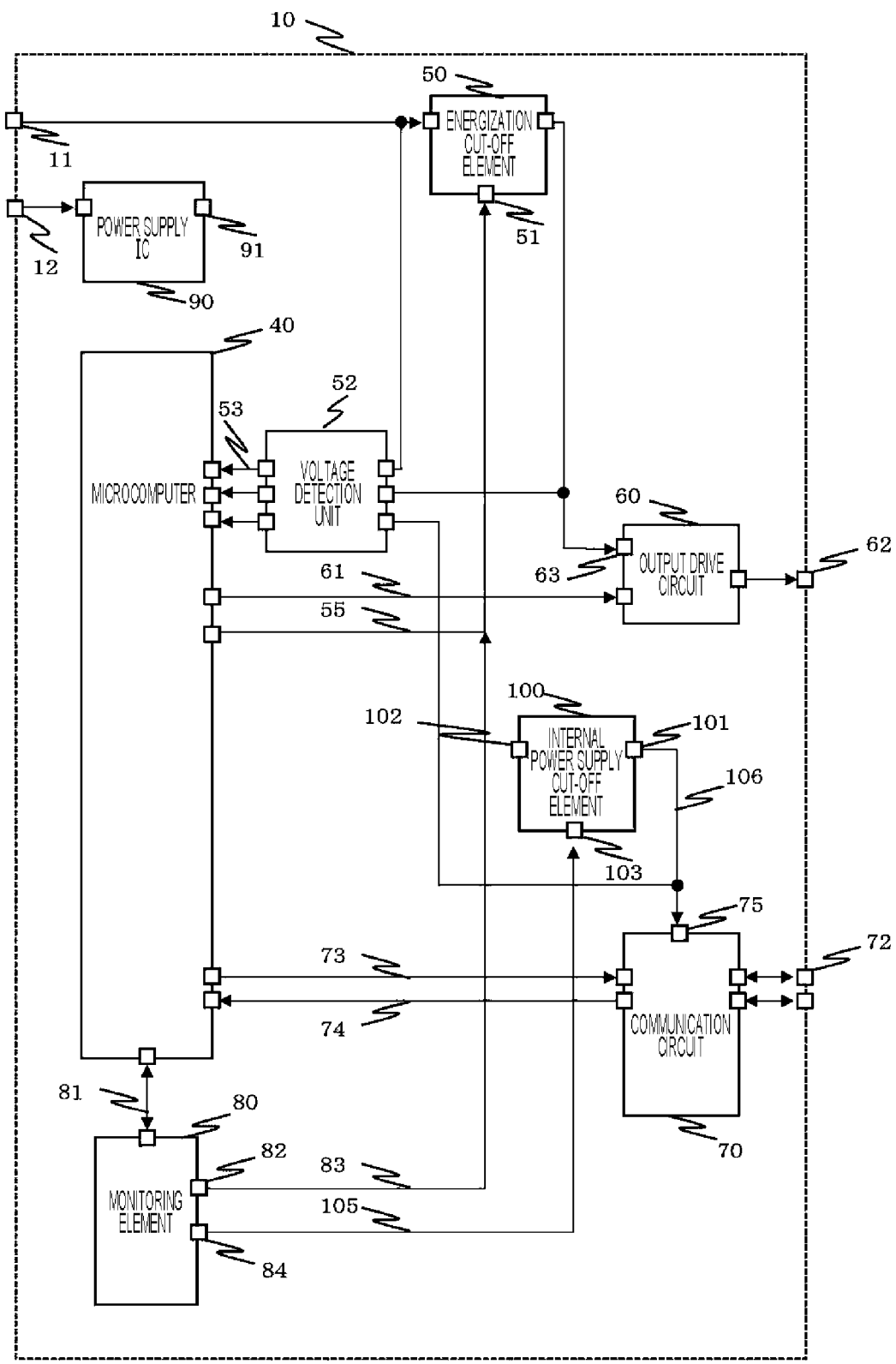
FIG. 4 is a schematic configuration diagram illustrating an on-vehicle control device according to a second embodiment.

FIG. 4 is a schematic configuration diagram illustrating an on-vehicle control device according to a second embodiment. In the following description, the same components as those of the on-vehicle control device 10 according to the first embodiment are denoted by the same reference signs, and the description thereof will be simplified.

The control device 10 of the present embodiment is different from that of the first embodiment in that an internal power supply cut-off element (power supply cut-off unit) 100 for energizing and cutting off the power supply of the communication circuit 70 is connected between the internal power supply voltage output terminal 91 of the power supply IC 90 and a communication circuit power supply terminal 75 of the communication circuit 70 and an internal power supply voltage 106 to be input to the communication circuit 70 is monitored by the voltage detection unit 52, and the other points are similar to those of the first embodiment.

The internal power supply cut-off element 100 is driven by an internal power supply energization signal 105 that is output from the monitoring element 80 and input to an internal power supply energization cut-off input terminal 103, and includes an internal power supply input terminal 102 to which the internal power supply energization signal 105 is input, and an internal power supply output terminal 101 that outputs an internal power supply voltage 106.

When the internal power supply energization signal 105 is in an energization state, the internal power supply voltage 106 is output to the internal power supply cut-off element 100, and the internal power supply voltage 106 is supplied to the communication circuit power supply terminal 75 of the communication circuit 70. When the internal power supply energization signal 105 is in a cut-off state, the internal power supply voltage 106 is not output to the internal power supply output terminal 101, and the internal power supply voltage 106 to the communication circuit power supply terminal 75 of the communication circuit 70 is cut off. That is, the communication circuit 70 can communicate only when the internal power supply energization signal 105 is energized, and the communication of the communication circuit 70 is cut off when the internal power supply energization signal 105 is cut off.

Next, an operation of the control device 10 will be described in detail with reference to FIGS. 5A to 5G.

FIGS. 5A to 5G are a time chart for explaining the operation of the on-vehicle control device according to the second embodiment.

FIGS. 5A to 5E are similar to the time chart illustrated in FIGS. 3A to 3G of the first embodiment. From times T1 to T6 and from times T15 to T19 are similar to the time chart illustrated in FIGS. 3A to 3G of the first embodiment.

The times T7 to T8 are times at which the monitoring element 80 outputs a cut-off signal to the internal power supply cut-off element 100 according to the information notified from the microcomputer 40. From times T7 to T8, the monitoring element 80 notifies the microcomputer 40 of the cut-off execution signal indicating that the internal power supply cut-off element 100 is cut off by the mutual monitoring communication signal 81.

The microcomputer 40 monitors the internal power supply voltage 106 to be supplied to the communication circuit 70 illustrated in FIG. 5G based on the cut-off execution signal notified from the monitoring element 80, confirms that the internal power supply voltage 106 decreases during the cut-off, and determines that the cut-off function of the communication circuit 70 is normal. On the other hand, when it cannot be confirmed that the internal power supply voltage 106 decreases based on the cut-off execution signal of the internal power supply cut-off element 100 notified from the monitoring element 80, the microcomputer 40 determines that the cut-off function of the communication circuit 70 has failed.

As described above, according to the present embodiment, the monitoring element 80 can switch the circuit to be cut off depending on the failure diagnosis state of the microcomputer 40, and the stepwise fail-safe can be achieved similarly to the first embodiment. As in the first embodiment, there is an effect that the frequency of the failure diagnosis for the cut-off function for each circuit can be increased and the failure of the cut-off function can be detected early.

Here, a configuration in which a plurality of communication circuits 70 are connected to the internal power supply cut-off element 100 will be considered.

In the case of the configuration of the first embodiment including the plurality of communication circuits 70, it is necessary to individually perform the failure diagnosis for the cut-off function for the plurality of communication circuits 70 in the confirmation of the cut-off of the communication circuits 70. On the other hand, in the case of the configuration of the second embodiment including the plurality of communication circuits 70, the failure diagnosis for the cut-off functions of the communication circuits 70 can be performed by confirming the voltage decrease in the internal power supply voltage 106 to which the communication circuit power supply terminals 75 of the plurality of communication circuits 70 are connected, and the failure diagnosis can be performed in a short time and simplified as compared with the first embodiment.

The present invention is not limited to the aforementioned embodiments, and includes various modification examples.

For example, the aforementioned embodiments are described in detail in order to facilitate easy understanding of the present invention, and are not limited to necessarily include all the described components. Furthermore, some of the components of a certain embodiment can be substituted into the components of another embodiment, and the components of another embodiment can be added to the component of a certain embodiment. Furthermore, another component can be added, removed, and substituted to, from, and into some of the components of the aforementioned embodiments.

As an example, in the above-described embodiments, although the single output drive circuit 60 and the single communication circuit 70 have been described as the control device 10, the present invention is also applicable to a case where a plurality of output drive circuits 60 or a plurality of communication circuits 70 are provided. In this case, effects similar to those of the embodiments can be obtained.

At this time, when the abnormality of the microcomputer 40 is detected, the monitoring element 80 may cut off the energization of the power supply voltage to at least one of the output drive circuits 60 based on a predetermined priority order, or may cut off the energization of the power supply voltage to all the output drive circuits 60. Similarly, when the abnormality of the microcomputer 40 is detected, the monitoring element 80 may switch the communication state of at least one of the communication circuits 70 based on a predetermined priority order such that only data reception can be performed, may switch the communication states of all the communication circuits 70 such that only data reception can be performed, or may cut off the energization of the power supply voltage to at least one of the communication circuits 70.

The switching of the communication state of the communication circuit 70 is confirmed by the method based on the communication error as described in the first embodiment and the method for monitoring the internal power supply voltage 106 from the internal power supply cut-off element 100 as described in the second embodiment, but may be confirmed by a combination thereof.

In the first embodiment, although the communication circuit 70 can be switched to either a state in which data transmission and reception can be performed or a state in which data transmission and reception cannot be performed (communication cut-off), the communication circuit 70 may be switched to a state in which only data reception can be performed instead of the communication cut-off state from the viewpoint of the failure diagnosis of the communication circuit 70. Alternatively, a configuration in which only data reception can be performed may be added in addition to the state in which the data transmission and reception can be performed and the state in which the data transmission and reception cannot be performed.

An example of the on-vehicle control device 10 to which the present invention is applied is a CVT control device. In this case, a subject to be driven by the plurality of linear solenoids 6 is a primary pulley, a secondary pulley, or the like.

Although the ECU 10 of the vehicle automatic transmission 2 has been described in the embodiments, the present invention is not limited to the vehicle automatic transmission, and even when the present invention is applied to a vehicle control device (for example, engine control device) including the output drive circuit 60 that drives a load and the communication circuit 70, it is possible to obtain effects similar to those in the present invention.

Furthermore, control lines and information lines illustrated are considered to be necessary for the description, and not all the control lines and information lines in a product are necessarily illustrated. Almost all the configurations may be considered to be actually connected to each other.

Reference Signs List

6 linear solenoid (external device)
10 on-vehicle control device
40 microcomputer (control unit)
50 energization cut-off element (energization cut-off unit)
52 voltage detection unit
53 upstream voltage
54 downstream voltage
60 output drive circuit (output drive unit)
70 communication circuit (communication unit)
80 monitoring element (monitoring unit)
100 internal power supply cut-off element (power supply cut-off unit)

The invention claimed is:

1. An on-vehicle control device, comprising:
   a control unit that performs a control operation of an external device;
   a monitoring unit that monitors the control unit;
   an output drive unit that sends a control signal to the external device based on an instruction from the control unit;
   a communication unit that switches a communication state with another on-vehicle control device based on an instruction from the monitoring unit; and
   an energization cut-off unit that energizes and cuts off a power supply voltage to be supplied to the output drive unit based on an instruction from the monitoring unit,
   wherein the monitoring unit independently instructs the switching of the communication state by the communication unit and the energization and cut-off of the power supply voltage by the energization cut-off unit.

2. The on-vehicle control device according to claim 1, wherein the monitoring unit switches the communication state of the communication unit and an energization state of the energization cut-off unit when an abnormality of the control unit is detected.

3. The on-vehicle control device according to claim 2, further comprising:
   a voltage detection unit that monitors an upstream voltage and a downstream voltage of the energization cut-off unit,
   wherein the control unit diagnoses a failure of the energization cut-off unit based on the upstream voltage and the downstream voltage when the energization cut-off unit cuts off the power supply voltage.

4. The on-vehicle control device according to claim 3, wherein the communication unit switches between a state in which signal transmission and reception to and from the other on-vehicle control device are performed and a state in which only signal reception from the other on-vehicle control device is performed.

5. The on-vehicle control device according to claim 4, wherein the monitoring unit cuts off the energization of the power supply voltage by the energization cut-off unit when the abnormality of the control unit is detected, and switches the communication unit to the state in which only the signal reception is performed.

6. The on-vehicle control device according to claim 3, further comprising:
a power supply cut-off unit that energizes and cuts off a power supply voltage to be supplied to the communication unit based on the instruction from the monitoring unit.

7. The on-vehicle control device according to claim 6, wherein the monitoring unit cuts off the energization of the power supply voltage by the power supply cut-off unit when the abnormality of the control unit is detected, and does not perform a signal transmission and reception by the communication unit.

8. The on-vehicle control device according to claim 1, further comprising:
a plurality of the communication units,
wherein the monitoring unit switches at least one communication unit to the state in which only signal reception is performed based on a predetermined priority order when an abnormality of the control unit is detected.

9. The on-vehicle control device according to claim 1, further comprising:
a plurality of the communication units,
wherein the monitoring unit switches all the communication units to the state in which only signal reception is performed when an abnormality of the control unit is detected.

10. The on-vehicle control device according to claim 1, further comprising:
a plurality of the communication units,
wherein the monitoring unit does not perform a signal transmission and reception by at least one communication unit based on a predetermined priority order when an abnormality of the control unit is detected.

11. The on-vehicle control device according to claim 1, further comprising:
a plurality of the output drive units,
wherein the monitoring unit cuts off the energization of the power supply voltage to at least one output drive unit based on a predetermined priority order when an abnormality of the control unit is detected.

12. The on-vehicle control device according to claim 1, further comprising:
a plurality of the output drive units,
wherein the monitoring unit cuts off the energization of the power supply voltage to all the output drive units when an abnormality of the control unit is detected.

* * * * *